H. F. LEITNER.
SOLDERING IRON GUN.
APPLICATION FILED MAR. 8, 1913.
1,092,725.
Patented Apr. 7, 1914.
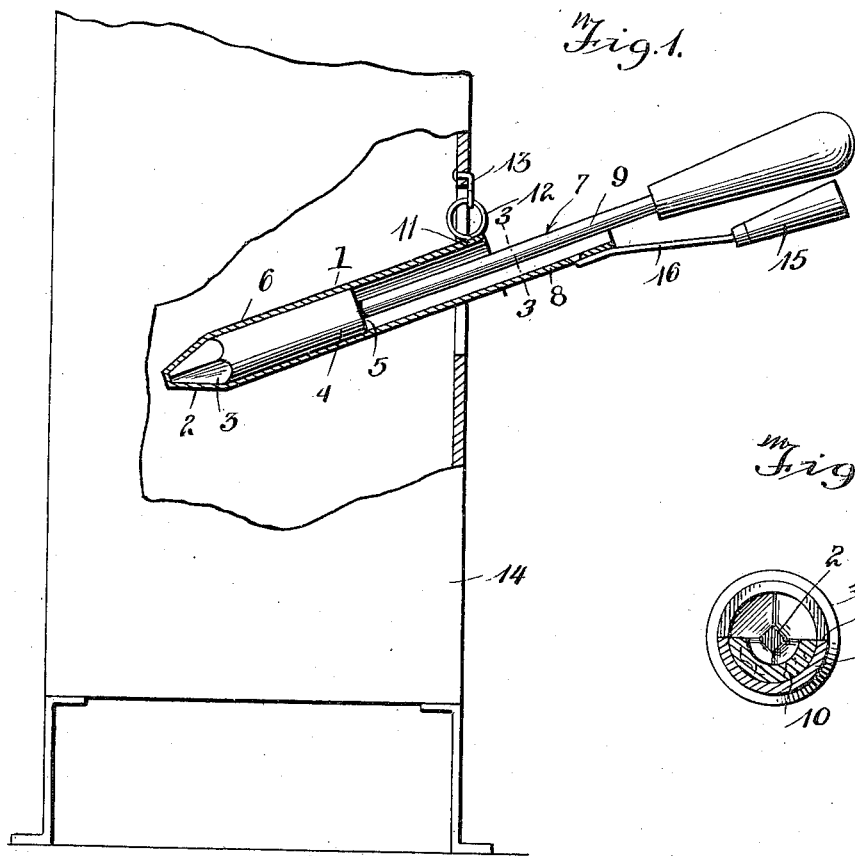
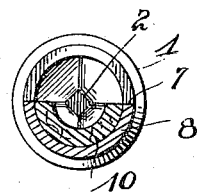
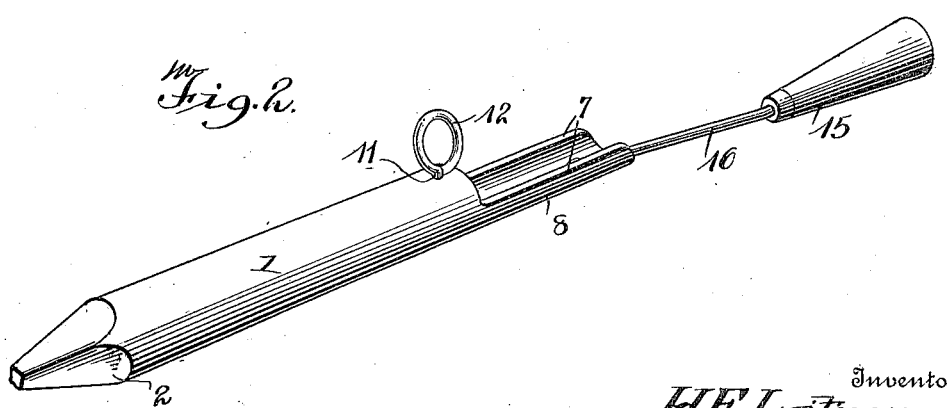
Witnesses
Ernest Crocker
Dudley B. Howard
Inventor
H. F. Leitner
By Victor J. Evans
Attorney

UNITED STATES PATENT OFFICE.

HUGO F. LEITNER, OF NIPOMO, CALIFORNIA.

SOLDERING-IRON GUN.

1,092,725. Specification of Letters Patent. Patented Apr. 7, 1914.

Application filed March 8, 1913. Serial No. 753,054.

*To all whom it may concern:*

Be it known that I, HUGO F. LEITNER, a citizen of the United States, residing at Nipomo, in the county of San Luis Obispo and State of California, have invented new and useful Improvements in Soldering-Iron Guns, of which the following is a specification.

This invention relates to a soldering iron gun, or device for subjecting a soldering iron to a source of heat without permitting direct contact of the flames or smoke with the soldering iron copper, and which thus keeps the latter clean and prevents the solder adhering thereto from becoming excessively heated during the heating of the iron.

An object of the invention is to provide a device of this character which includes a supporting barrel into which the soldering iron is inserted, and which barrel is subjected directly to the heat of the fire pot or other form of heater which is generally used for heating soldering irons and the like, the barrel being constructed of good heat-conducting material similar in shape to the soldering iron so that its inner surfaces will evenly engage the outer surfaces of the latter, thus causing the heat to be evenly distributed throughout the copper of the soldering iron.

A further object is the provision of a soldering iron gun which is simply constructed and is portable, so as to be adapted for use in connection with any desired source of heat and to be very durable and efficient in the use for which it is intended.

The invention consists in the features of construction, combination and arrangement of parts, hereinafter fully described and claimed, reference being had to the accompanying drawing, in which:

Figure 1 is a fragmentary side elevation of a tinner's portable fire pot, showing the gun applied thereto with a soldering iron positioned within the same, the said gun being shown in fragmentary side elevation; Fig. 2 is a detail perspective view of the gun, and; Fig. 3 is a transverse sectional view taken on line 3—3 of Fig. 1, showing a lining of asbestos applied thereto and a soldering iron in position.

In the drawing, the numeral 1 designates the hollow, cylindrical body or barrel of the device, one end of which is closed by the provision of a head 2 which is pointed so as to conform in shape with the pointed end 3 of the copper 4 of a soldering iron 5, such as is shown in Fig. 1. The metal of which the barrel is formed is primarily a good conductor of heat, such as iron or brass, and is also of equal thickness throughout so as to conduct the heat, which is applied directly to the outer surface of the said barrel, with equal rapidity to all parts of the soldering iron copper, it being understood that the inner surfaces of the barrel 6 are shaped so as to conform to the shape of the outer surfaces of the soldering iron copper, and thus evenly contact with the same. The end portion of the barrel 1 opposite to the closed end 2 thereof is partially cut away as at 7 to provide a shelf or hearth 8 adapted to support the shank 9 of the soldering iron when in applied position within the barrel of the gun. This hearth may be lined with asbestos as indicated by the numeral 10 in Fig. 4 of the drawing so that the shank of the soldering iron will not contact with the hearth and thus become unnecessarily heated in case it becomes distorted in shape.

As shown in Fig. 1, the barrel 1 of the device is provided in its top wall adjacent the cut away portion 7 with an opening 11 for the reception of an attaching ring 12, which latter is adapted to be engaged with a supporting hook 13, which may be provided conveniently upon a tinner's fire pot 14, so as to support the device with its barrel disposed on the inside of the heater in direct contact with the hot coals or flame of the same.

A suitable handle 15 has its shank 16 secured to the outer end of the hearth 8 so as to provide means by which the gun may be readily handled without danger of burning one's fingers.

In using a device of this nature, the barrel of the same may be continuously subjected to the heat of a convenient source, such as that shown in Fig. 1, so that it will be heated to a high temperature at all times. When it is desired to heat the copper of a soldering iron, the latter is inserted within the barrel of the device, while the latter is steadied by holding the handle 15 thereof, and the soldering iron is rotated until the angular point of its copper comes into secure engagement with the similarly shaped inner faces of the barrel head 2. The copper will thus be indirectly heated by the flames or hot coals without becoming coated with soot or otherwise soiled. In reheating the copper of the soldering iron, the globules of solder which ordinarily adhere thereto will not become excessively heated, which would cause unnecessary waste of the same, and which is a constant occurrence in the present day practice of applying the soldering iron copper directly to the source of heat.

From the foregoing description, it should be apparent to those skilled in the different arts to which my invention appertains, that I have provided a simply constructed and efficient device which should fill a long felt need, and which will be inexpensive in the cost of manufacture.

Having thus described my invention, what I claim is:

1. The combination with a heating device including a hollow body having a lateral opening therein, of a portable barrel of cylindrical construction adapted to be mounted within the said opening, the inner end of said barrel being closed and its outer end portion having the upper half thereof cut away longitudinally to provide a semi-cylindrical hearth, the said hearth being transversely concavo-convex, the said barrel being adapted for the reception of a soldering iron with its handle projecting outwardly from the hearth, a handle connected with the outer end of the hearth and being disposed in prolongation thereof so as to be substantially coextensive with the soldering iron handle, the barrel being constructed of heat conducting material, and a lining of non-heat-conducting material for the hearth.

2. The combination with a heating device including a hollow body having a lateral opening therein, of a portable barrel of cylindrical construction adapted to be mounted within the said opening, the inner end of said barrel being closed and its outer end portion having the upper half thereof cut away longitudinally to provide a semi-cylindrical hearth, the said hearth being transversely concavo-convex, the said barrel being adapted for the reception of a soldering iron with its handle projecting outwardly from the hearth, a handle connected with the outer end of the hearth and being disposed in prolongation thereof so as to be substantially coextensive with the soldering iron handle, the body of the heating device being provided with a supporting hook depending into the lateral opening therein, the said hook being arranged with its bill projecting transversely within the opening, and a ring provided upon the open end of the barrel at the upper edge thereof for engagement with the supporting hook, the said ring being arranged so that its opening extends laterally with respect to the longitudinal axis of the barrel.

In testimony whereof I affix my signature in presence of two witnesses.

HUGO F. LEITNER.

Witnesses:
S. M. DANA,
RUTH DANA.

---

Copies of this patent may be obtained for five cents each, by addressing the "Commissioner of Patents, Washington, D. C."